(No Model.) 2 Sheets—Sheet 1.

A. WILKIN.
POTATO DIGGER.

No. 439,223. Patented Oct. 28, 1890.

Attest
A. Edmunds
Carl Hayden

Inventor
Alexander Wilkin
By P. J. Edmunds
Att'y (No Model.) 2 Sheets—Sheet 2.

A. WILKIN.
POTATO DIGGER.

No. 439,223. Patented Oct. 28, 1890.

Attest
A. Edmunds
Carl Hayden

Inventor
Alexander Wilkin
By P. J. Edmunds
Att'y

THE NORRIS PETERS CO., PHOTO-LITHO., WASHINGTON, D. C.

UNITED STATES PATENT OFFICE.

ALEXANDER WILKIN, OF LONDON, ONTARIO, CANADA.

POTATO-DIGGER.

SPECIFICATION forming part of Letters Patent No. 439,223, dated October 28, 1890.

Application filed August 17, 1889. Serial No. 321,164. (No model.)

*To all whom it may concern:*

Be it known that I, ALEXANDER WILKIN, a subject of the Queen of Great Britain, and a resident of London township, in the county of Middlesex, in the Province of Ontario, Canada, have invented certain new and useful Improvements in Potato-Diggers, of which the following specification, taken in connection with the accompanying drawings, forms a full, clear, and exact description.

The object of this invention is to dig the potatoes from the hills, separate them from the surrounding earth, and deposit them safely on the surface of the ground; and it consists of the improved construction and combination of parts of the same, as will be hereinafter first fully set forth and described, and then pointed out in the claims.

Reference is had to the accompanying drawings already mentioned, wherein—

Figure 1:
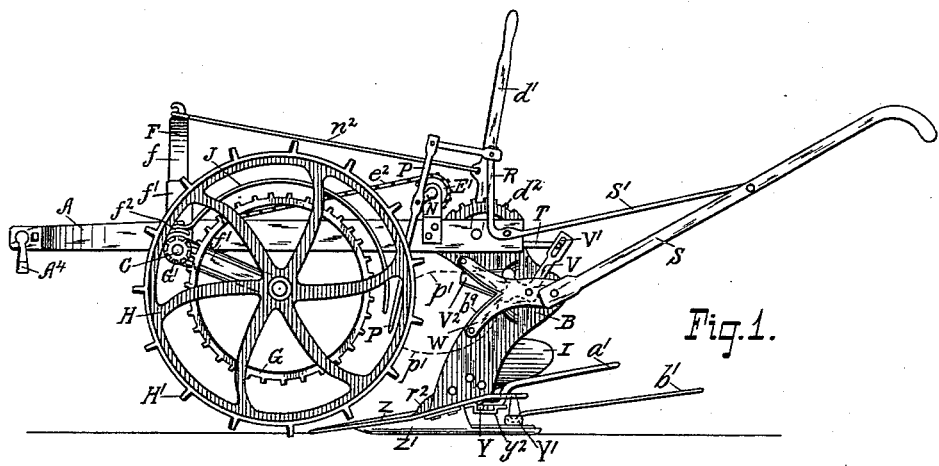
Figure 2:
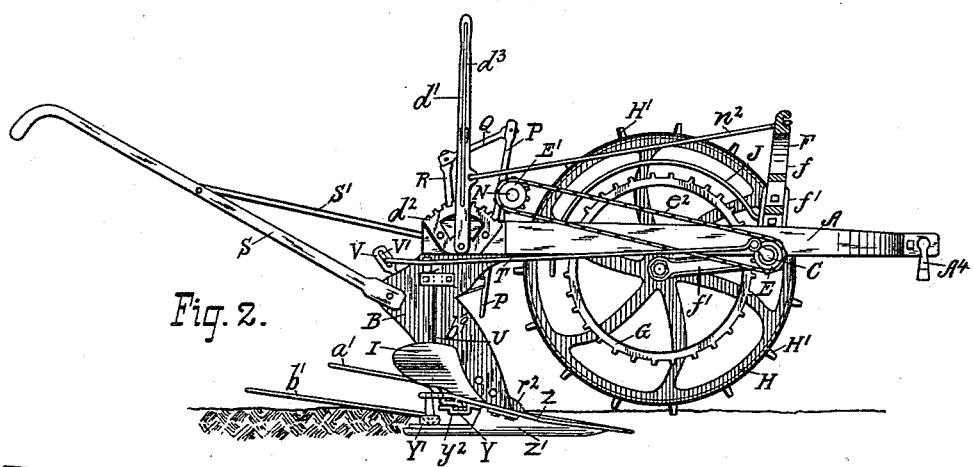
Figure 3:
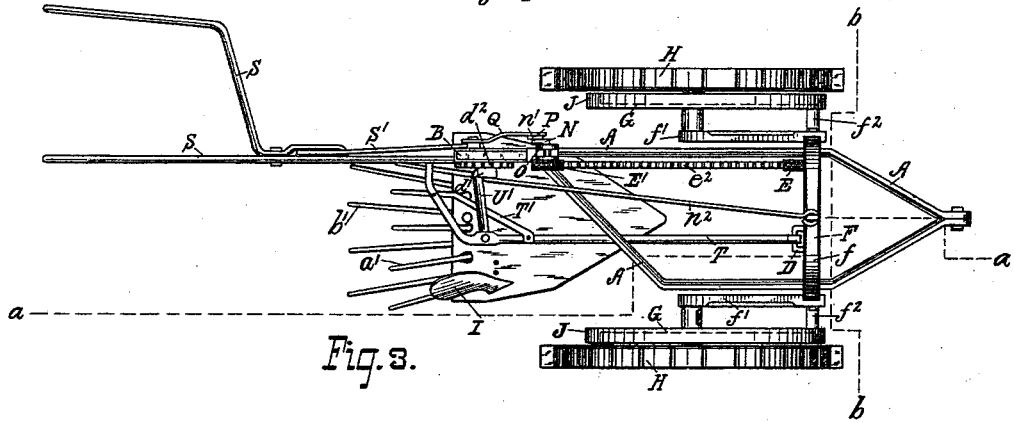
Figure 4:
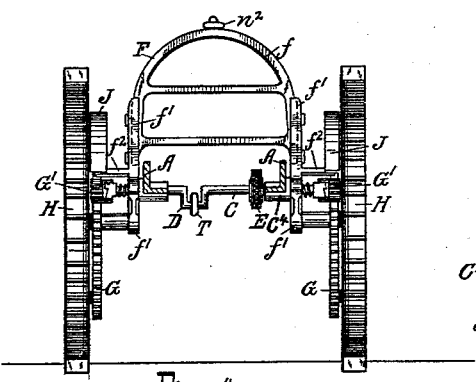
Figure 8:
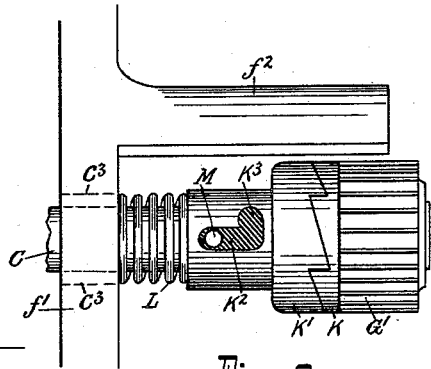
Figure 5:
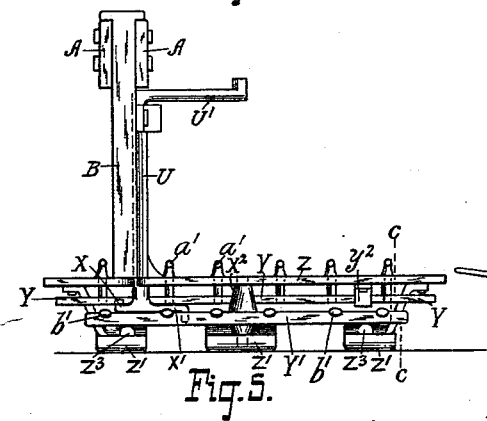
Figure 6:
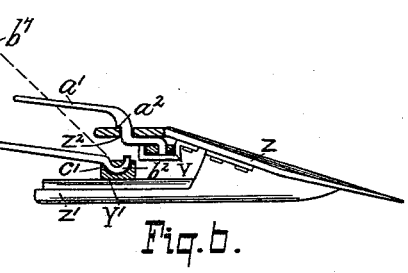
Figure 7:
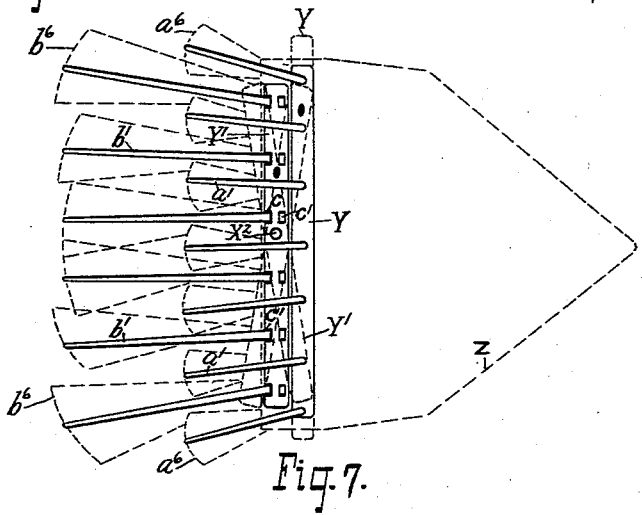

Figure 1 is a side elevation of a potato-digger embodying this invention. Fig. 2 is a view of the opposite side of the machine to that shown in Fig. 1. This view is partly in section on the line $a\,a$ of Fig. 3. Fig. 3 is a plan view of Fig. 1. Fig. 4 is an end view of the same. This view shows the frame in section on the line $b\,b$ of Fig. 3. Fig. 5 is an enlarged detail rear-end view of the digging and vibrating mechanism. This view also shows a rear view of the standard and a portion of the frame to which it is attached. Fig. 6 is a view, partly in section, on the line $c\,c$ of Fig. 5. Fig. 7 is an enlarged detail plan view of the vibrating fingers and their operating-bars. This view also shows their position in relation to the digging-blade. Fig. 8 is an enlarged detail side elevation of the devices and their connections for throwing the machine in or out of gear.

A designates the main frame; B, the standard to which the frame A is secured, and which supports the latter at the rear end.

C designates the shaft on which the frame is supported near the front end, the frame A being pivotally secured to the shaft C.

D designates a crank on the shaft C, and E a chain-wheel rigidly secured to said shaft.

F designates a supplemental frame, which may be pivoted on the shaft C or on a sleeve $C^3$, secured to or extending from the boxing $C^4$ or frame A, and on this sleeve $C^3$ the lower part or arms $f'$ of the supplemental frame F are pivoted; and the arms $f'$ are preferably secured at an angle to the arched part $f$.

H H designate the traction-wheels, revolving perfectly free on studs or bolts secured in or formed on the lower part or arms $f'$ of the frame F, and these traction-wheels H are formed with flanges H', which are embedded in the ground by the weight of the machine. They are used for the purpose of preventing the wheels from slipping, and are the immediate cause of progression and operation of the machine.

G G designate toothed wheels, one rigidly secured to each of the traction-wheels H, and G' designates toothed pinions rigidly secured to the shaft C at each end, with which pinions G' the toothed wheels G engage. These toothed wheels and pinions G and G' communicate motion from the wheels H to the shaft C, as well as to the crank D and chain-wheel E.

J designates guards, which are secured to a flange $f^2$ on the frame F or other suitable support, and are adjusted in position over the toothed wheels G and pinions G' to prevent the sand, &c., adhering to the traction-wheels H or flanges H' from falling in between the teeth of said toothed wheels G or pinions G' when the machine is in operation.

Rigidly secured to or formed integral with the toothed pinions G' are the ratchets K, (shown particularly in Fig. 8,) with which the ratchets K', which are loose on the shaft C, engage. These ratchets are held together by a spring L, compressed between the part $f'$ of the frame F or the sleeve $C^3$ and the end of each of the ratchets K'. These loose ratchets K' slip back from the ratchets K and permit the machine to be readily and easily turned or drawn back to adjust the digging-blade in a line with the rows or hills of potatoes, and these loose ratchets K' are prevented from revolving independently of the shaft C by the stud-pin M, passing through the slot $K^2$ in each of the ratchets K' and then rigidly secured in the shaft C. This retains the machine in gear; but by adjusting the ratchets K' back from the ratchets K, which is permitted by the slot $K^2$ being elongated and by adjusting the stud-pin M in the recess $K^3$ at one side of the slot $K^2$, the ratchets K and K' are held apart and the machine out of gear, so that it may travel over the ground on the wheels H from one field to another without operating the machine.

E' designates a chain-wheel rigidly secured to a shaft N, held in place by and revolving perfectly free in a bracket O, rigidly secured to the frame A, and to the crank $n'$ of the shaft N a picker P is pivotally secured, and Q is a connecting-bar, which connects the upper end of the picker P with the upright R, and the latter is rigidly secured to the frame A, and $e^2$ is a chain-belt which passes over and communicates motion from the chain-wheel E to the chain-wheel E', so that as the machine is operated the lower end of the picker P moves in the direction shown by dotted line $p'$, and picks away any potato-tops, weeds, or other similar obstructions, and prevents them from collecting or accumulating in front of the standard B.

S designates the handles which may be used to assist in guiding and steadying the machine. These handles are preferably secured to the standard B, as shown in Figs. 1 and 2 of the accompanying drawings, or to the frame A, and S' is a brace which rigidly braces the handles S to the frame of the machine. These handles S are constructed and arranged at one side of the digging-blade Z, as shown in Fig. 3, so that the driver may walk at one side of and between the rows or hills of potatoes, instead of on them, as he would do if the handles were directly behind and in a line with the digging-blade Z; or a seat for the driver may be secured to the frame A, if preferred, and the handles dispensed with.

T is a connecting-bar which is pivotally connected at one end to the crank D, and to this bar T, as shown in Figs. 2 and 3. The angular arm U' of the rocking standard U is pivotally secured, and the latter is held in place by the digging-blade Z, standard B, and clips, boxes, or other suitable securing devices secured to said standard B, and the other end of the bar T is connected to the end of the bell-crank lever V or is secured in a slot V' in said bell-crank lever V, and this bell-crank lever V may be pivotally secured to and between the standard B and the plate W, as shown in Fig. 1, or in a slot in the standard B, and a knife $V^2$ is secured to the bell-crank lever V, which may operate in a slot through the standard B, or it may operate between the plate W and standard B, so that the inclined edges $b^9$ of the latter, as well as the plate W, will act as a second shear to cut any potato-tops or weeds the instant they collect in front of the standard B, so that the knife $V^2$, in connection with the picker P, prevents any accumulation of potato-tops, weeds, &c., in front of the standard B.

T' is a brace for bracing and steadying the end of the bar T, this brace also passes under the angular arm U' of the rocking standard U and assists in holding the bar T engaged therewith. This connecting-bar T may be formed in one piece or it may be formed in two sections, one provided with sockets, to which the end of the adjacent section is fitted, and a pin is passed through holes in each to hold them together. By removing this pin one section could slide in the sockets in the other. This would throw the machine out of gear to prevent its operation, except the shaft C and the section of the bar T connected with the crank D.

X X' designate arms rigidly secured to or formed integral with the rocking standard U.

Y designates the sliding bar, supported and guided by the bracket or guide $y^2$ and the arm X, and with the latter the sliding bar Y is pivotally connected, so that as the rocking standard U is operated a motion lengthwise of the sliding bar Y is imparted to the latter.

The arm X' is pivotally secured to the bar Y', and the latter is pivoted on studs or bolts $X^2$, secured in the digging-blade Z and guard or shoe Z'; or, if preferred, the bar Y' may be pivoted on the rocking standard U, so that as the rocking standard V is operated a swinging motion is imparted to said bar Y'.

$a'$ designates fingers, (shown particularly in Fig. 6,) which are bent and extend through slots $z^3$ in the digging-blade Z or a plate or other suitable support at the rear of the digging-blade Z, and these fingers $a'$ are pivotally secured to the sliding bar Y, and a portion $a^2$ of the fingers $a'$ rests on the digging-blade Z, or it may rest on any other suitable support, so that as the sliding bar Y is operated as before described and guided by the bracket or guide $y^2$ a pivotal lateral vibrating motion is imparted to the fingers $a'$ in the direction of the dotted lines $a^6$, as shown in Fig. 7, in order to separate the earth from the potatoes and screen the latter, leaving them on top of the ground.

$b'$ designates fingers, each of which is provided with hooked or curved ends $b^2$. These are inserted and secured in sockets C' in the pivotal bar Y', as shown in Figs. 6 and 7, so that they will all simultaneously vibrate with the pivotal bar Y' from side to side, as shown by dotted lines $b^6$ in Fig. 7, to assist in perfecting the separation of the potatoes from the earth; but if the guard or shoe Z' should pass over any unusual projection—such as a stone, for instance—after passing the stone the shoe would fall down at the side thereof and the fingers $b'$ would strike it, which would have a great tendency to break one or more of fingers opposite the obstruction—that is, if they were rigidly secured to the sliding bar Y'; but these fingers $b'$ rest loosely in the sockets C', and being curved or hooked at $b^2$, as shown in Fig. 6, where they engage with the pivotal bar Y', they may automatically rise to the position shown by dotted line $b^7$, and are thereby completely prevented from breaking. At the same time the hook $b^2$ is formed large enough to prevent the finger $b'$ from disengaging from the bar $Y'$, and as soon as the fingers $b'$ pass the obstruction they fall into place in the socket $C'$ in the swinging bar $Y'$ again. At the same time, when no unusual projection is immediately under said fingers $b'$, they are firmly held by their own weight in the socket $C'$ to vibrate or swing sidewise with the pivotal bar $Y'$.

The guards or shoes $Z'$ are rigidly secured near their front end to the digging-blade $Z$, and are for the purpose of strengthening the digging-blade, as well as to form a recess for the sliding and pivotal bars $Y$ and $Y'$ to protect them from becoming clogged with earth, &c., and also to form a bearing for the stud or bolt $X^2$, on which the bar $Y'$ is pivoted, and to reduce the friction of the swinging bar $Y'$ on these shoes $Z'$ they are preferably provided with narrow flanges $Z^3$, on which the bar $Y'$ is supported while in operation.

The standard $B$ may be formed integral with or secured to the digging-blade $Z$ by bolts or other suitable securing devices, and at one side thereof, so as to be as much as possible out of the way of potato-tops or weeds, as well as not to interfere with the potatoes when passing over the digging-blade $Z$, and to further assist in holding the standard $B$ rigid a stop or flange $r^2$ is formed on the digging-blade $Z$, against which the lower part of the front edge of the standard $B$ abuts.

$d'$ designates a lever fulcrumed on the frame $A$ of the machine, which is provided with a spring-actuated dog $d^3$, and the latter is adjusted to engage with the cogs of a cog-segment $d^2$ to hold the lever $d'$ at the position to which it is adjusted, said cog-segment being secured to the frame $A$ or other suitable support.

$n^2$ designates a connecting-rod, which is attached at one end to the lever $d'$ and at the other end to the frame $F$, so that as the lever $d'$ is adjusted backward or forward the upper part $f$ of the frame $F$ is adjusted in the same direction and in a proportionate distance. This raises or lowers the frame $A$ according to the direction the lever $d'$ is adjusted. If the lever is adjusted forward, the frame $A$ is lowered and the digging-blade is pointed toward the ground; but, vice versa, if the lever $d'$ is adjusted rearward the frame $A$ is raised and the digging-blade is raised to dig any depth into or be raised clear above the ground, if required.

I designates a mold-board, which is secured to the digging-blade $Z$, and adjustable thereon by bolts passing through a slot or holes in the digging-blade, or by any other suitable securing device. This mold-board I is used for the purpose of cutting off and separating the earth containing the potatoes from the earth at one side, so that only the earth containing the potatoes will pass onto the vibrating fingers $a'$ $b'$. This mold-board I also serves as a guide to conduct the earth containing the potatoes as it passes over the digging-blade $Z$ onto the vibrating fingers $a'$ $b'$ and to prevent the earth from falling off at the side of the fingers $a'$ $b'$ before it is separated from the potatoes. The standard $B$ and mold-board I may be extended backward, or wings may be attached to these parts for the purpose of preventing the fingers from throwing the earth or potatoes off at one side instead of it falling between them, as it should do in order to thoroughly separate the potatoes therefrom.

The operation is as follows: When the horses are attached to the clevis $A^4$ and the machine placed in position so that the hill or row of potatoes will be directly in front of the digging-blade $Z$ and between the standard $B$ and mold-board I, the horses will walk between the rows or hills of potatoes, and the mold-board I is adjusted a sufficient distance from the standard $B$ so that all the earth containing the potatoes will be embraced between them and separated by them from the earth between the hills or rows. The spring-actuated dog $d^3$ is then disengaged from the teeth of the cog-segment $d^2$, and the lever $d'$ is adjusted forward, which moves the arched part $f$ of the supplemental frame $F$ forward the same proportionate distance. This lowers the frame $A$ and inclines the point of the digging-blade $Z$ toward the ground. These parts are held in this position by permitting the dog $d^3$ to engage with the teeth of the cog-segment $d^2$ again. As the machine moves forward the digging-blade enters the ground in proportion to the distance the main frame $A$ is lowered. This digging-blade $Z$ passes under the hill or row of potatoes, and the succeeding hill pushes the former over on the fingers $a'$ and $b'$, which are vibrated, as before described, and completely and thoroughly separates the earth from the potatoes, leaving the latter on top of the ground. At the same time, if any of the tops or weeds should collect in front of the standard $B$, they are pushed away by the picker $P$ or cut by the knife $V^2$, and thereby prevented from accumulating, and when through digging the potatoes, by disengaging the spring-actuated dog $d^3$ from the teeth of the cog-segment $d^2$ and adjusting the lever $d'$ rearward, the upper part $f$ of the frame $F$ is moved rearward and the main frame $A$ raised, and the point of the digging-blade $Z$ may be raised clear above and at an incline upward from the ground. When in this position, the rear part of the guard or shoes $Z'$ rests on the ground, and by permitting the spring-actuated dog $d^3$ to engage with the teeth of the cog-segment $d^2$ again the machine is held in this position.

When digging potatoes in dry sandy soil, either of the vibrating fingers $a'$ or $b'$ could be used alone, and they would perfectly separate the earth from the potatoes; but if the ground were wet or stiff it would be necessary that the earth containing the potatoes should be acted upon by both sets of fingers, in order to thoroughly and completely separate the potatoes from the earth.

Having thus described my invention, I claim—

1. The frame A, standard B, digging-blade Z, and the pivotal vibrating fingers $a'$, extending through and having a portion $a^2$ resting on said digging-blade, in combination with the sliding bar Y, guide $y^2$, standard U, having arms X and U', and means for operating the same, substantially as and for the purpose set forth.

2. The frame A, standard B, and digging-blade Z, shoe Z', studs $X^2$, and the swinging vibrating fingers $b'$, secured to and in combination with the pivotal bar Y', standard U, having arms X' and U', and means for operating the same, substantially as and for the purpose set forth.

3. The frame A, standard B, digging-blade Z, shoe Z', studs $X^2$, and the swinging vibrating fingers $b'$, formed with curved ends $b^2$, in combination with the bar Y', formed with sockets C', and the standard U, having arms X' and U', substantially as and for the purpose set forth.

4. The digging-blade Z, guard or shoe Z', the pivotal vibrating fingers $a'$, the vibrating fingers $b'$, sliding bar Y, guide or bracket $y^2$, pivotal bar Y', rocking standard U, having arms X, X', and U', and means for operating the same, in combination with the standard B and frame A, substantially as and for the purpose set forth.

5. The digging-blade Z, the standard B, secured thereto at one side, and the plate W, having inclined edges $b^9$, and the frame A, in combination with the bell-crank lever V, having a knife $V^2$ secured thereto, and means for operating the latter, substantially as and for the purpose set forth.

6. The digging-blade Z, the standard B, secured thereto at one side, the mold-board I, the frame A, the bracket O, shaft N, having crank $n'$, upright R, connecting-bar Q, and picker P, and means for operating the same, substantially as and for the purpose set forth.

7. The digging-blade Z, the guard or shoe Z', vibrating fingers $a'$ $b'$, sliding bar Y, guide or bracket $y^2$, pivotal bar Y', rocking standard U, having arms X, X', and U', and means for operating the same, in combination with the standard B, plate W, frame A, bell-crank lever V, and knife $V^2$, and means for operating the same, substantially as and for the purpose set forth.

8. The digging-blade Z, the guard or shoe Z', vibrating fingers $a'$ $b'$, sliding bar Y, guide or bracket $y^2$, pivotal bar Y', rocking standard U, formed with arms X, X', and U', and means for operating the same, in combination with the standard B, frame A, bracket O, shaft N, having crank $n'$, upright R, connecting-bar Q, and picker P, and means for operating the same, substantially as and for the purpose set forth.

9. The combination of the supplemental frame F, the sleeves $C^3$, the main frame A, shaft C, standard B, and digging-blade Z, substantially as and for the purpose set forth.

10. The supplemental frame F, the wheels H, having flanges H' formed thereon, shaft C, the frame A, and sleeve $C^3$, in combination with the connecting-bar $n^2$, lever $d'$, and means for holding the lever at the position to which it is adjusted, substantially as and for the purpose set forth.

11. The wheels H, having flanges H' formed thereon, frame F, toothed wheels G, and pinions G', shaft C, and frame A, in combination with the ratchets K K', stud-pin M, and spring L, substantially as and for the purpose set forth.

12. The guards J, secured to the flanges $f^2$ on the frame F or other suitable support, in combination with wheels H, toothed wheels G, and pinions G', substantially as and for the purpose set forth.

In testimony whereof I affix my signature in the presence of the two undersigned witnesses.

ALEXANDER WILKIN.

Witnesses:
P. J. EDMUNDS,
A. EDMUNDS.